Sept. 26, 1961   J. A. BERSETH   3,001,328
GLASS BENDING LEHRS AND CONVEYORS THEREFOR
Original Filed Sept. 28, 1956   6 Sheets-Sheet 1

INVENTOR.
JOHN A BERSETH
BY
Oscar L. Spencer
ATTORNEY

Sept. 26, 1961    J. A. BERSETH    3,001,328
GLASS BENDING LEHRS AND CONVEYORS THEREFOR
Original Filed Sept. 28, 1956    6 Sheets-Sheet 2

INVENTOR.
JOHN A. BERSETH
BY Oscar H. Spencer
ATTORNEY

Sept. 26, 1961 J. A. BERSETH 3,001,328
GLASS BENDING LEHRS AND CONVEYORS THEREFOR
Original Filed Sept. 28, 1956 6 Sheets-Sheet 4

INVENTOR.
JOHN A. BERSETH
BY Oscar L. Spencer
ATTORNEY

Sept. 26, 1961  J. A. BERSETH  3,001,328
GLASS BENDING LEHRS AND CONVEYORS THEREFOR
Original Filed Sept. 28, 1956  6 Sheets-Sheet 5

INVENTOR.
JOHN A. BERSETH
BY Oscar L. Spencer
ATTORNEY

United States Patent Office 3,001,328
Patented Sept. 26, 1961

3,001,328
GLASS BENDING LEHRS AND CONVEYORS THEREFOR
John A. Berseth, Whitehall, Pa., assignor to Pittsburgh Plate Glass Company, Allegheny County, Pa., a corporation of Pennsylvania
Continuation of application Ser. No. 612,863, Sept. 28, 1956. This application July 25, 1958, Ser. No. 751,057
7 Claims. (Cl. 49—7)

The present application is a continuation of abandoned application Serial No. 612,863, filed September 28, 1956, for Glass Bending Lehrs.

The present invention relates broadly to glass bending lehrs and conveyors therefor. More particularly, it relates to improvements in glass bending lehrs to bend flat glass sheets into shapes of a complex nature having regions of relatively gentle curvature and other regions of relatively severe curvature.

Glass sheets are conventionally bent by mounting them while flat on suitable molds and introducing the glass laden molds into a tunnel-like lehr having zones of progressively increasing heat. When the glass reaches a zone where the temperatures are sufficiently high, the sheets soften and settle onto the surface of the supporting mold. When the mold surfaces include relatively sharply curved areas, it has been found advantageous to create local zones of concentrated heat in the general furnace heating zones to cause more rapid softening of those portions of the glass sheet that are to settle into registry with the sharply curved regions of the mold.

Localized heating has been accomplished by incorporating electrical heating elements as part of the bending mold structure to heat the adjacent areas of the glass sheets supported for bending on the mold. The present invention provides novel structure for selectively actuating the electrical heating elements forming part of the mold structure as the molds are conveyed through the bending section of a bending lehr. The electrical heating elements are electrically connected between spaced rails that ride along laterally spaced, opposed, longitudinally extending sets of stub rolls.

In order to produce the localized heating of the glass sheets, the bending lehr is provided with a stub roll conveyor comprising laterally spaced, opposed, longitudinally extending sets of stub rolls for conveying glass laden molds therethrough, wherein certain stub rolls of one set are insulated electrically from stub rolls laterally spaced and opposed to said certain stub rolls and electrical means coupled to at least a portion of one of said sets for providing a potential difference between the certain laterally opposed stub rolls of said sets. One set of rolls is located along one side of the conveyor and the rolls of said set are spaced from one another longitudinally of the conveyor. The other set of rolls is located along the other side of the conveyor and the rolls of the other set are spaced from one another longitudinally of the conveyor. Each roll of one set opposes a roll of the other set in laterally spaced relation thereto.

The novel lehr structure according to an illustrative embodiment of the present invention incorporates a stub roll conveyor including grounded stub rolls, wherein at least a portion of the stub rolls along one side of the conveyor is insulated from ground and coupled to a source of potential. The spaced rails of the bending mold serve as electrical contacts to close an electrical circuit between the insulated stub rolls and their laterally spaced, opposed, grounded stub rolls through the electric heating elements when the molds are conveyed through the portion of the conveyor having the insulated stub rolls.

In the drawings which form part of the description, like reference numerals are provided throughout to designate the same elements. In the drawings.

A typical bending lehr illustrating the present invention is shown in the drawings. In these drawings, the apparatus comprises a loading station 20 including an elevator conveyor 22 used to lower mold support carriages from a mold return conveyor 24 to the loading station. A stub roll conveyor 26 (omitted from FIGURE 1 for the sake of clarity) extends through the entire length of the lehr. At the end of the lehr is a discharge station 28 where the glass laden molds are removed. A lifting conveyor 30 transfers the molds after the bent glass is unloaded therefrom onto the mold return conveyor 24. The details of the elevator 22, mold return conveyor 24 and lift 30 do not form any part of the present invention.

Figure 1:
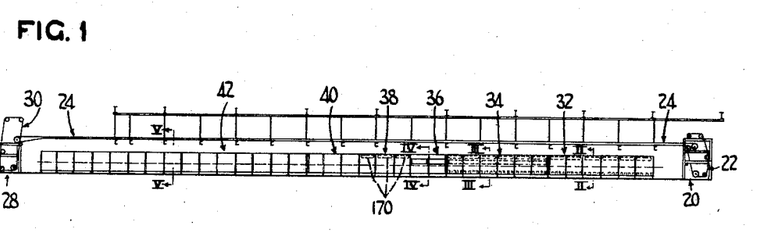
FIGURE 1 is a longitudinal elevation of a particular bending lehr built in accordance with the principles of the present invention.

The conveyor 26 extends consecutively through a preheat section 32, a bending section 34, a neutralizing zone 36, an annealing and reheating section 38, a second annealing section 40 and a cooling section 42.

The present invention resides in the particular construction of the conveyor, the bending lehr, and the sequence of its sections, as well as in the particular structural elements included in the bending section.

*Preheating section*

Figure 2:
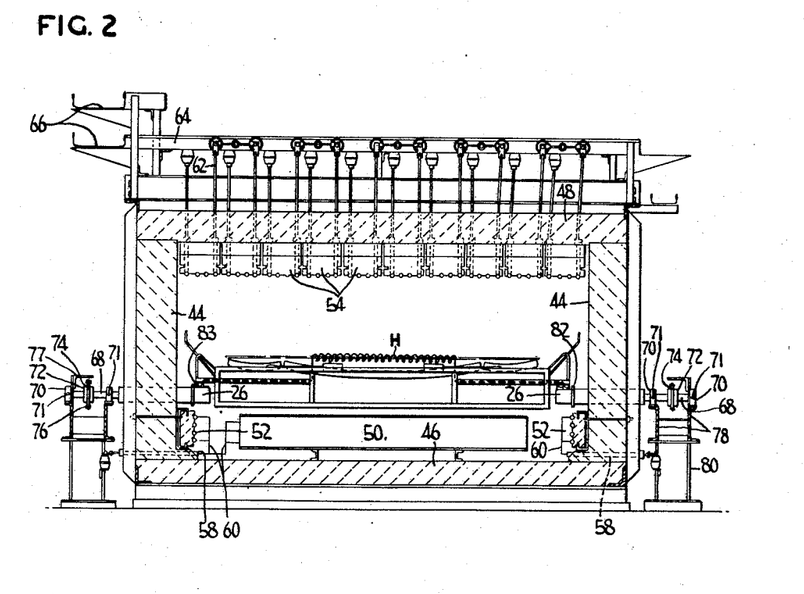
FIGURE 2 is a sectional view taken along the lines II—II of FIGURE 1.

As shown in detail in FIGURE 2, the preheating section comprises spaced vertical lehr walls 44 mounted on a floor 46 and interconnected at their tops by a roof 48 to provide a tunnel like enclosure of ceramic material. In the preheat section, the glass is heated uniformly throughout its extent by means of bottom electrical heating elements 50 whose longest dimension extends transversely of the lehr, and side electrical heating elements 52 and top electrical heating elements 54 whose longest dimension extends longitudinally of the lehr. The heating elements are arranged in sets aligned transversely of the lehr. The sets are spaced longitudinally from each other a distance on the order of 5 inches. In this section, bottom heaters 50 and side heaters 52 irradiate the bottom glass surface while top heaters 54 irradiate the top glass surface.

Figure 10:
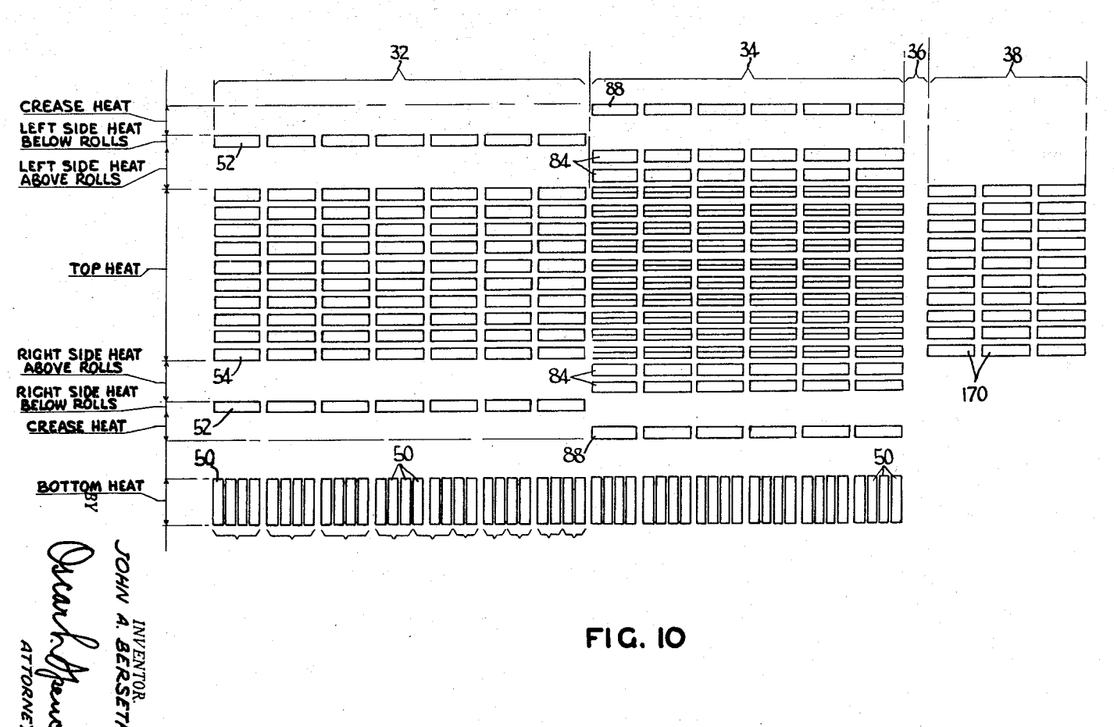
FIGURE 10 is a schematic block diagram showing the layout of the various electrical heaters throughout a bending lehr exemplifying the present apparatus.
Figure 11:
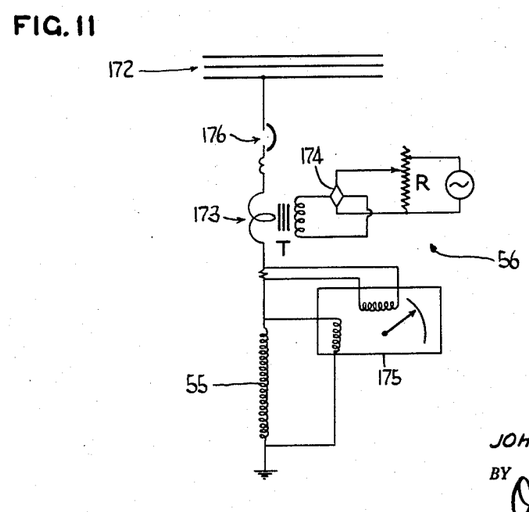
FIGURE 11 is a representative electrical control circuit for each individually controlled electrical heater in the exemplary bending lehr.

Each heating element comprises a resistor 55 connected to a source of electrical energy through a separate voltage regulator circuit 56 (FIGURE 11) in a manner shown in FIGURES 10 and 11. The bracketed bottom heating elements of FIGURE 10 are connected in parallel sets of two, three or four to a single voltage regulator circuit.

Suitable ceramic sleeves 58 are provided to insure that the circuit conduits 60 for the bottom and side elements are properly insulated electrically from any metal reinforcing structure used in the lehr. Each top heating element 54 receives electrical energy through conduits 60 and 62 encased in suitable insulation. The conduits are carried above the roof 48 of the lehr on transversely extending troughs 64 and longitudinally extending troughs 66 to individual voltage regulator circuits 56.

The stub rolls 26 are mounted on shafts 68. Each latter passes through a pair of pillow blocks 70. The pillow blocks contain bearings and set screws 71 which permit sliding of the stub roll shaft laterally of the conveyor axis in order to adjust the location of the stub rolls to compensate for expansion and contraction of the mold carriages as the latter are conveyed through the bending lehr. The stub roll shafts 68 are fixed to drums 72 which rotate with sprockets 74 driven by a conveyor chain 76. The pillow blocks 70 are supported on base channels 78 to which they are attached. The base channels form the upper supporting structure for columns 80.

Lateral adjustment of the stub rolls 26 is desirable because of the provision of guiding flanges 82 adjacent the inboard extremities of the stub rolls. Unless the guide flanges are located sufficiently outboard laterally of the conveyor, the rails 83 which carry the bending carriages through the lehr will jam on the flanges because of the thermal expansion of the carriages.

*Bending section*

The structural details of the bending section of the lehr will be understood better by referring to FIGURES 3 and 6 to 9. In this section, the top heating elements 54 and the bottom electrical heating elements 50 are located in positions similar to those for the preheating section. The longitudinal extremities of the top heating elements are separated from their neighboring top heating elements. The roof 48 is provided with narrow laterally extending slots 49 immediately above a portion of the space intermediate longitudinally adjacent sets of overhead heaters.

Figure 3:
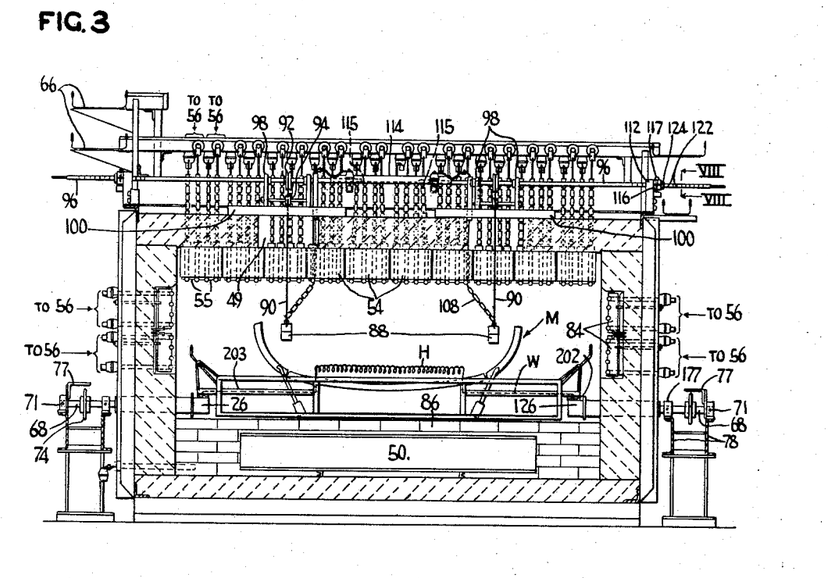
FIGURE 3 is a sectional view taken along the lines III—III of FIGURE 1.

In this section, the bending section side heating elements 84 are located above the support level of the conveyor, whereas in the preheat section, the side elements are located below this support level. This higher location of the side heating elements in the bending section assures heat delivery to the glass extremities that are raised upwardly during the bending action.

The bending section is also provided with transverse baffle walls 86 interposed between the bottom heating assemblies 50 and the molds. These baffle walls provide a muffle heat arrangement.

An important feature of this structure is the provision of crease heaters 88. In the embodiment shown in FIGURES 3 and 6 to 9, crease heaters 88 are supported at each end by cables 90 and 91 extending through slots 49 in the roof. The cables are entrained about pulley 92 in pairs. Cable 90 depends directly from pulley 92 to support one end of a crease heater 88. Cable 91 is entrained about an idler wheel 94 to support an adjacent end of the adjacent crease heater. Each pulley 92 is mounted on an axle rod 96 which forms a bearing rod for rotating pulleys 92. The bending section comprises a number of pulleys 92, one for each crease heater extremity. No idler wheels 94 are required for the front of the first crease heater or the rear of the last crease heater. Rotating the axle rod 96 raises or lowers the support wires 90 and 91 thereby adjusting the vertical position of the crease heaters 88 within the lehr.

The axle rods 96 are secured to bearing brackets 98. The latter in turn are spaced transversely of the lehr to form uprights for a support structure which includes an apertured sliding plate 99 to which is attached a refractory block 100 having aligned apertures. Bearing brackets 98 are interconnected by a bearing rod 101 upon which idler wheel 94 rotates. The plates 99 are wider and longer than the slots 49 cut out of the bending section roof, thus insuring that the lehr heat is not lost through the roof. The lehr roof 48 is reinforced with angle irons 103 to facilitate sliding of plate 99 thereon. The apertures of the plate receive the cables 90 and 91 as well as conduits 105, which supply electrical power to the crease heaters. Moving axle rods 96 transversely of the lehr disposes the plates 99, pulleys 92, idler wheels 94 and crease heaters 88 into their desired transverse positions relative to the lehr within the limits permitted by the slots 49.

Conduits 105 are threaded through elongated ceramic sleeves 106 and spools 108. The conduits 105 are provided with a slackened extension 109 between the ceramic sleeve 106 and an electrical connector 110 in order to insure that the crease heaters are maintained connected to a source of electrical energy regardless of movement of the plate 99.

The axle rods 96 are each supported on an end support 112 and a center channel support 114 forming part of the structural framework for the lehr. The latter comprises laterally spaced and opposed channels 115. Movement of each axle rod 96 through supports 112 and 114 insures that the crease heaters are moved with the support housing provided by the base plate 99 perpendicularly to the direction of glass movement through the lehr. The opposing channels of the center channel support 114 terminate outwardly of the longitudinal center line of the lehr.

A split collar 116 is mounted on each end support to provide a bearing for each axle rod 96. A screw 117 is used to tighten the split collar about its axis rod to lock the axle rod in place, thus assuring that the crease heaters remain in a fixed position until a change of location is desired. Flanged grooves 118 extend longitudinally of each axle rod 96 and receive the shoes of a slidable pointer 120. Circular index lines 122 are marked on the axle rod and numbered to indicate the lateral position of the crease heater extremities carried by the axle rod and the support structure. The grooves 118 are substantially coextensive with the index lines 122. When the collar 116 is tightened, it is fixed securely to the axle rod 96 and limits the inward movement of the latter to a position determined by abutment of collar 116 against end support 112.

A washer dial 124 is mounted in fixed orientation to the outboard surface of the collar 116. The dial face is provided with indicia 125. Pointers 120 indicate the vertical position of the crease heater extremities by the orientation relative to the dial face.

In order to position the crease heaters for a particular band, the split collars 116 are loosened to enable rotation of the axle rods 96. When the rods have been rotated sufficiently as indicated by the setting of the pointer 120 on washer dial 124, the rods 96 are displaced laterally until the proper index line or space therebetween registers with the washer dial. Screws 117 are then tightened to secure the split collars 116 about their respective axle rods 96. Thus, the crease heaters are located in a horizontal and vertical position that can be recorded for subsequent duplication when fabrication of the particular part is repeated.

Another novel feature of the bending section and one that is especially important is providing for impressing a potential difference between certain stub rolls. This is accomplished by providing insulated stub rolls 126 coupled electrically to a source of potential along one side of the bending section. Since the stub rolls 26 of the lehr conveyor are grounded, actuating the insulated stub rolls 126 causes a potential difference to exist across laterally opposing conveyor stub rolls. The use of this impressed potential will be described in detail below.

Neutralizing section

Figure 4:
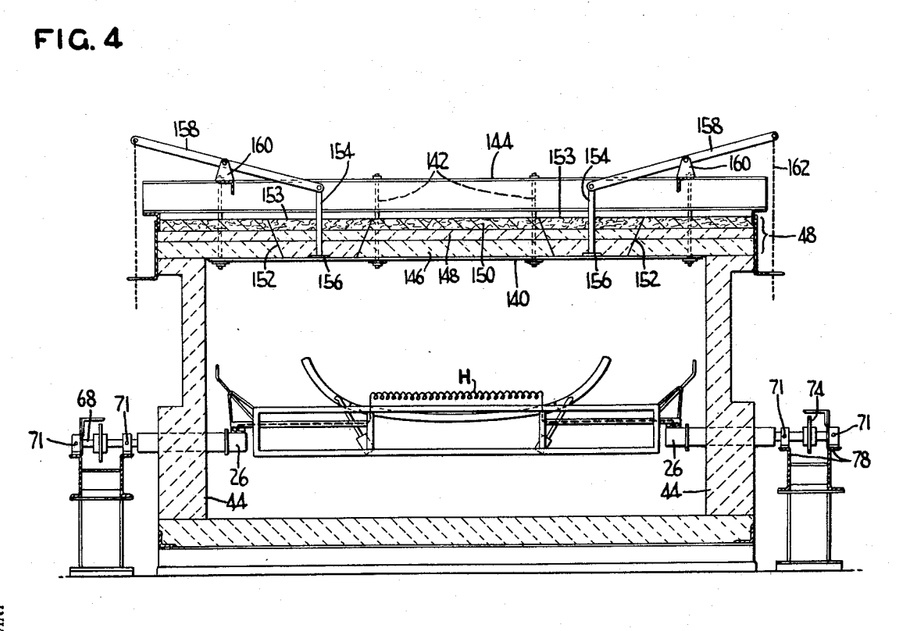
FIGURE 4 is a cross sectional view taken along the lines IV—IV of FIGURE 1.
Figure 5:
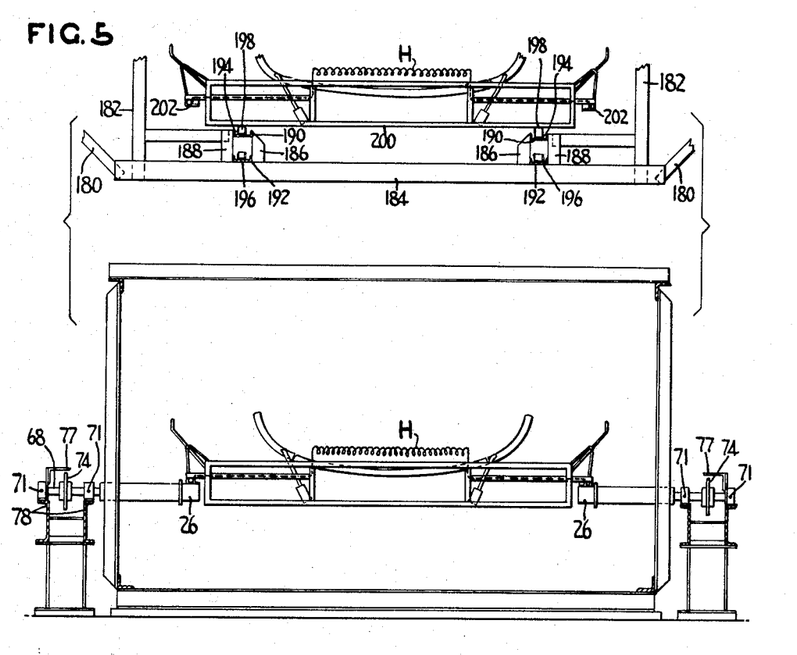
FIGURE 5 is a cross sectional view of the lehr taken along the lines V—V of FIGURE 1.
Figure 6:
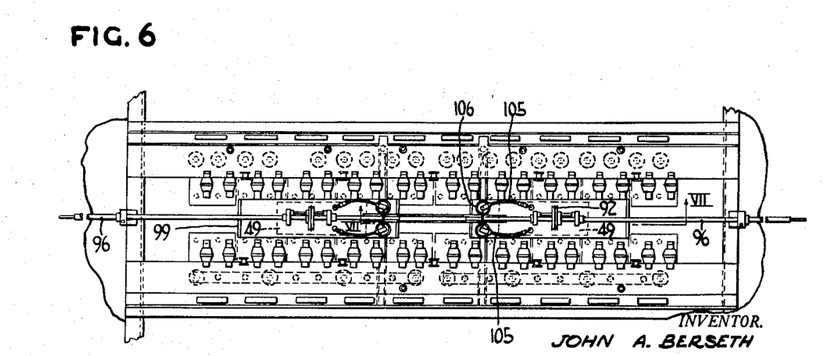
FIGURE 6 is an enlarged, detailed plan view of details forming part of the present structure.
Figure 7:
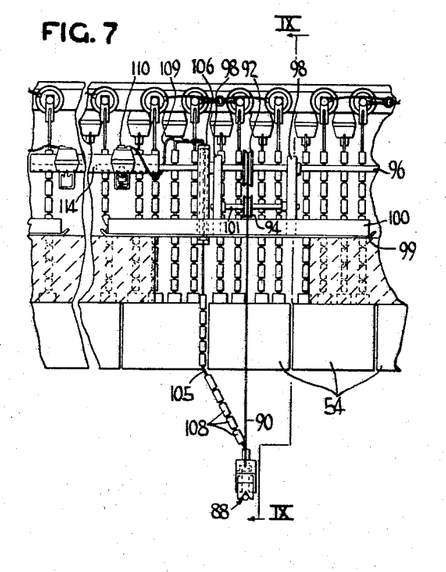
FIGURE 7 is a fragmentary sectional view taken along the lines VII—VII of FIGURE 6.
Figure 8:
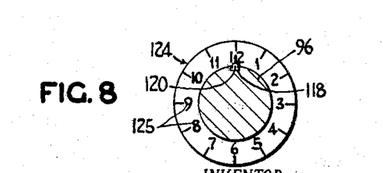
FIGURE 8 is a sectional view taken along the lines VIII—VIII of FIGURE 3.
Figure 9:
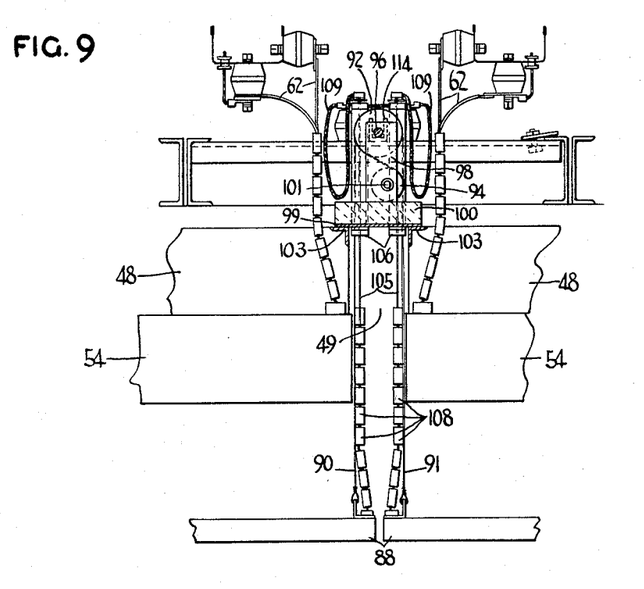
FIGURE 9 is a detailed sectional view along the lines IX—IX of FIGURE 7.

A cross sectional view of the neutralizing or normalizing section 36 is shown in FIGURE 4. No heat is imparted to this portion of the furnace. The walls 44 are of insulated refractory material and the furnace roof 48 includes an 8 inch stainless steel plate supported by thrust pins 142 whose upper ends are carried by girders 144. The stainless steel plate 140 supports a laminate of refractory material which may include a 3 inch layer of refractory 146 underlying a 2 inch layer of refractory 148. A 2 inch blanket 150 of rock wool lies atop the 2 inch refractory and is spaced from the bottom of the girder 144.

Keystone shaped apertures 152 are cut in the refractory roofing material 146, 148 and 150. The Keystone shaped closure members 153 formed from the cut away portions of the insulating roofing materials are carried by a support pin 154 comprising a bottom support flange 156. The upper end of the pin is pivoted at one end of a lever arm 158 which is pivoted about a bracket 160 mounted on the girder 144. A chain 162 is utilized for rotating the lever arm 158 and lifting or lowering the keystone shaped refractory material relative to the roof. The latter may be attached to a hand wheel and brake unit (not shown).

The amount that each keystone shaped refractory closure member 153 is raised from its associated keystone shaped recess 152 determines the rate of cooling imparted to the glass sheets conveyed through this section. The apertures are above the severely bent portions of the glass conveyed through this lehr section to enhance cooling of the glass in these portions.

The purpose of the normalizing section is to permit the glass sheets after they have been subjected to glass bending temperatures, to cool to the top of the annealing range as rapidly as possible. By providing adjustable cooling apertures, the total length of the bending lehr, including its annealing section, can be reduced considerably. Alternatively, for a given length of bending and annealing lehr, the productive capacity can be increased by virtue of the inclusion of this section wherein the glass is cooled rapidly from glass softening temperatures to the top of its annealing range. For plate glass this range of cooling is from about 1250° F. (softening point) to about 1050° F. (top of the annealing range).

Annealing and cooling zones

The next lehr section 38 is termed the annealing and reheating section. This section is similar in structure to the preheating section except that the bottom heaters 50 and side heaters 52 are omitted. Electrical heating elements 170 are supported in the roof of this section. These heating elements are separately connected to individual control circuits 56 and are arranged in a plurality of rows. The provision of separate control elements for each of the heaters 170 overcomes any tendency toward non-uniform temperature across the glass sheet by having each individual overhead heater supply an amount of heat needed to moderate the cooling rate of the incremental portion of the glass sheets that pass thereunder. The glass sheets are then conveyed through the second annealing section 40 wherein the glass is cooled through its annealing range while maintaining a minimum temperature differential throughout the sheet. The cooling tunnel 42 located immediately beyond the second annealing section 40 facilitates the rapid cooling of the glass sheets below the annealing range to a temperature at which they can be handled and unloaded from the molds at the discharge and unloading station 28.

Electrical control circuits

Electrical control circuits are provided for each bank of resistances depicted by a block in FIGURE 10, with the exception of the bottom heaters 50 that are bracketed. The bracketed bottom heaters are controlled by means of an individual voltage control such as a variable transformer (not shown). Similarly, each bank of resistances depicted by a block in FIGURE 10 is controlled by an individual voltage control unit. Thus, the heating pattern traversed by the glass sheets moving laterally through the bending lehr may be modified to provide the desired overall heating or moderated cooling effect along the path of glass movement as well as the desired variations in the heating pattern transversely of the path of movement.

A typical control circuit for any individual resistor 55 forming the basic component of any of the heating elements 50, 52, 54, 84, 88 or 170 is shown schematically in FIGURE 11. Each resistor 55 (or parallel bank of resistors in the case of certain bottom heating elements in the preheat section) is grounded at one end and coupled to one of the phases of a three phase power line 172 through a saturable reactor circuit 173, including a transformer T, a selenium rectifier 174 and a variable resistor R. A wattmeter 175 indicates the power delivered to the resistor. When the wattmeter shows that the power delivered to the resistor 55 is not correct, the setting of resistance R of the saturable reactor circuit is changed, thereby affecting the reactance provided by the saturable reactor and changing the heating effect of resistor 55. A circuit breaker 176 is included in the circuit for safety purposes.

Insulated stub rolls

In forming compound bends, it is sometimes desirable to utilize electric heating elements carried with the mold for bending the sheet transversely of its longitudinal dimension. This may be accomplished by providing a potential difference across the rails of each bending mold and having the bending mold provided with electric heating coils which are electrically connected between the rails. The stub rolls 26 along one side of the bending zone are grounded, while the insulated stub rolls 126 along its opposite side are fabricated as disclosed in FIGURE 12.

Figure 12:
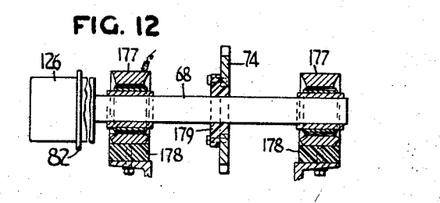
FIGURE 12 is a detailed sectional view of an insulated stub roll assembly usable with the present invention.

In FIGURE 12, the insulated stub roll 126 is provided with a flange collar or guide flange 82 near its inboard extremity and is journaled within slip rings carried by special pillow blocks 177. The latter are insulated from the grounded base channel 78 by means of an insulation block 178 which may be made of any suitable electrical insulation material such as phenolic resin or other electrically non-conductive material. In addition, the sprocket 74 drives the shaft 68 of the stub roll through an insulated bushing 179.

In FIGURE 3, a special mold M provided with heating coils H is shown traversing the bending zone of a lehr. This special mold comprises rails 202 attached to support tubes 203 of a non-conductive material such as porcelain, and wires W threaded through the support tubes to provide an electrical connection between opposite rails 202 and the extremities of the heating coil H. The latter is mounted above a longitudinally extending region of the glass sheet to be bent transversely sufficiently close to the glass support level to allow the special molds to pass through the bending section of the lehr without having any part of the mold or carriage structure abut the crease heaters H.

Electrical energy is supplied to the special pillow blocks from a power source (not shown). Current through the pillow blocks is transmitted through drive shaft 68 to stub rolls 126. Current passes through the rail 202 of the carriage riding the stub roll to the heating coils H carried by the mold to impart localized heating to certain portions of the glass. The circuit is completed through the opposite rail of the mold carriage and the opposite stub roll, which is grounded through drive shaft 68, pillow blocks 70 and grounded base channel 78 from which the pillow blocks are not insulated electrically. Rails 202 and heating coils are insulated from the rest of the mold structure.

The above description of a desirable lehr made in accordance with the present invention has been for the purpose of illustration rather than limitation. The scope of the present invention is limited only by the accompanying claims. Furthermore, the right to present claims to other inventions disclosed herein in other copending applications is not precluded by presenting claims limited as follows.

What is claimed is:

1. In a tunnel-like lehr for bending glass sheets to non-uniform shapes on glass shaping molds having spaced support rails and a local electrical heating element interconnected between the support rails, said lehr comprising a conveyor for transporting glass sheet supporting molds therethrough, comprising a pair of laterally spaced, opposed, sets of stub rolls, each set comprising a plurality of stub rolls spaced from one another longitudinally of said conveyor the improvement comprising certain stub rolls of one of said sets insulated electrically from stub rolls laterally spaced and opposed to said certain stub rolls and electrical means coupled to at least a portion of one of said sets for providing a potential difference between the certain laterally opposed stub rolls of said sets, whereby, the local electrical heating element is energized upon contact between the spaced rails and the laterally opposed stub rolls when a potential difference is provided.

2. In a tunnel-like lehr for bending glass sheets to non-uniform shapes comprising a conveyor for transporting glass sheet supporting molds having spaced support rails and a local electrical heating element interconnected between the support rails through said lehr and grounded stub rolls for said conveyor, the improvement comprising a set of insulated stub rolls spaced from one another longitudinally of said conveyor in laterally spaced relation to certain grounded stub rolls along one side of at least a portion of said conveyor and electrical means coupled to said set to establish a potential difference between said insulated stub rolls and said certain grounded stub rolls, whereby, the local electrical heating element is energized upon contact between the spaced rails and the laterally opposed stub rolls when a potential difference is provided.

3. In a tunnel-like lehr including a bending zone for bending glass sheets to non-uniform shapes comprising a conveyor for transporting glass sheet supporting molds having spaced support rails and a local eelctrical heating element interconnected between the support rails through said lehr, comprising a pair of laterally opposed sets of stub rolls, each set comprising stub rolls spaced from one another longitudinally of said conveyor, a portion of each set extending through said bending zone, the improvement comprising electrical means coupled to the portion of at least one of said sets for providing a potential difference between certain laterally opposed stub rolls within said bending zone, whereby, the local electrical heating element is energized upon contact between the spaced rails and the laterally opposed stub rolls when a potential difference is provided.

4. In a tunnel-like lehr including a bending zone for bending glass sheets to non-uniform shapes comprising a conveyor for transporting glass sheet supporting molds having spaced support rails and a local electrical heating element interconnected between the support rails through said lehr, grounded stub rolls for said conveyor, the improvement comprising a set of insulated stub rolls comprising rolls spaced from one another longitudinally of said conveyor along one side of at least a portion of said conveyor in laterally spaced relation to certain of said grounded stub rolls within said bending zone and electrical means coupled to said set to establish a potential difference between said set and certain laterally opposed stub rolls within said bending zone, whereby, the local electrical heating element is energized upon contact between the spaced rails and the laterally opposed stub rolls when a potential difference is provided.

5. Apparatus for bending elongated glass sheets into non-uniform curvatures having both longitudinal and transverse bends of a complex nature comprising a horizontally disposed, tunnel-type lehr, a stub roll conveyor for moving glass sheets therethrough on bending molds, said conveyor comprising a pair of laterally spaced, opposed, sets of stub rolls, each set comprising rolls spaced from one another longitudinally of said conveyor, and a bending zone for said lehr containing overhead heaters above and across the conveyor path, auxiliary heaters aligned longitudinally of the path of travel of the molds within said bending zone, and electrical means coupled to at least a portion of one of the sets of stub rolls for providing a potential difference between certain laterally opposed stub rolls within the bending zone, said molds being provided with rails adapted to ride on the stub rolls to make electrical contact therewith, and an electrical circuit coupled between the opposed rails, said circuit including a heating coil fixed to the mold and extending transversely of the path of mold movement, whereby the auxiliary heaters provide means for bending a localized portion of each glass sheet severely about the axis of mold movement and the electrical energy passed through the heating coil carried by each mold provides localized heating for bending a localized portion of each glass sheet transversely of the first severe bend.

6. Apparatus according to claim 5 wherein the lehr comprises support means for auxiliary heaters and means for adjusting the auxiliary heaters vertically relative to the support means and means for adjusting the support means transversely of the axis of movement of said conveyor.

7. Apparatus according to claim 5 wherein the stub rolls of one set located within the bending zone are insulated.

References Cited in the file of this patent

UNITED STATES PATENTS

| | | |
|---|---|---|
| 1,733,270 | Messer | Oct. 29, 1929 |
| 1,791,404 | Fahrenwald | Feb. 3, 1931 |
| 2,111,392 | Galey | Mar. 15, 1938 |
| 2,175,580 | Traher | Oct. 10, 1939 |
| 2,267,207 | Martin | Dec. 23, 1941 |
| 2,506,524 | Stuck | May 2, 1950 |
| 2,671,988 | Walters | Mar. 16, 1954 |
| 2,794,300 | Golightly | June 4, 1957 |

UNITED STATES PATENT OFFICE
CERTIFICATE OF CORRECTION

Patent No. 3,001,328      September 26, 1961

John A. Berseth

It is hereby certified that error appears in the above numbered patent requiring correction and that the said Letters Patent should read as corrected below.

Column 4, line 37, for "axis" read -- axle --.

Signed and sealed this 4th day of September 1962.

(SEAL)
Attest:

ERNEST W. SWIDER
Attesting Officer

DAVID L. LADD
Commissioner of Patents